(12) United States Patent
Hwang

(10) Patent No.: US 11,779,890 B2
(45) Date of Patent: Oct. 10, 2023

(54) NANO-MICRO BUBBLE GENERATOR

(71) Applicant: CYAG CO., LTD., Seongnam-si (KR)

(72) Inventor: Changbae Hwang, Seoul (KR)

(73) Assignee: CYAG CO., LTD., Seongnam-si (KR)

( * ) Notice: Subject to any disclaimer, the term of this patent is extended or adjusted under 35 U.S.C. 154(b) by 424 days.

(21) Appl. No.: 16/956,768

(22) PCT Filed: Dec. 20, 2018

(86) PCT No.: PCT/KR2018/016288
§ 371 (c)(1),
(2) Date: Jun. 22, 2020

(87) PCT Pub. No.: WO2019/124992
PCT Pub. Date: Jun. 27, 2019

(65) Prior Publication Data
US 2021/0060502 A1    Mar. 4, 2021

(30) Foreign Application Priority Data

Dec. 22, 2017   (KR) .................. 10-2017-0178169
Dec. 22, 2017   (KR) .................. 10-2018-0069889
(Continued)

(51) Int. Cl.
*B01F 3/04* (2006.01)
*B01F 7/00* (2006.01)
(Continued)

(52) U.S. Cl.
CPC ...... *B01F 23/2334* (2022.01); *B01F 27/1151* (2022.01); *B01F 27/191* (2022.01); *B01F 23/2373* (2022.01); *B01F 27/053* (2022.01)

(58) Field of Classification Search
CPC .............. B01F 23/2323; B01F 23/233; B01F 23/2334; B01F 23/2373; B01F 25/312;
(Continued)

(56) References Cited

U.S. PATENT DOCUMENTS 956,065 A * 4/1910 Fleming ............... B01D 9/004
                                                    210/201
1,924,080 A * 8/1933 Gram .................... D01F 2/08
                                                    241/46.11
(Continued)

FOREIGN PATENT DOCUMENTS

CN       104533501 A    4/2015
EP       0068363 A1    1/1983
(Continued)

OTHER PUBLICATIONS

Sung, Choi, Translated Patent Application of KR101015477B1 (Year: 2011).*

*Primary Examiner* — Elizabeth Insler
(74) *Attorney, Agent, or Firm* — Bridgeway IP Law Group, PLLC; Sang Ho Lee; Hyun Woo Shin

(57) ABSTRACT

Provided is a nano-micro bubble generator according to one aspect of the present invention, the nano-micro bubble generator including: a housing which a fluid flows into and out of; a plurality of rotors rotatably coupled to the inside of the housing; and a plurality of stators fixed to the inside of the housing and alternately arranged with the plurality of rotors, wherein at least one of the rotors and the stators has a mesh-like structure in which a plurality of flow passages of the fluid are arranged in a lattice form, and the rotors and the stators are arranged to be adjacent to each other so as to generate a collision, friction, and cavitation due to rotation of the rotors in the fluid flowing through the flow passages, thereby generating at least one of nano bubbles and micro bubbles in the fluid.

12 Claims, 12 Drawing Sheets

(30) Foreign Application Priority Data

Jan. 22, 2018 (KR) ........................ 10-2018-0007697
May 24, 2018 (KR) ........................ 10-2018-0059131

(51) Int. Cl.
*B01F 23/233* (2022.01)
*B01F 27/191* (2022.01)
*B01F 27/1151* (2022.01)
*B01F 23/2373* (2022.01)
*B01F 27/053* (2022.01)

(58) Field of Classification Search
CPC ................ B01F 25/4331; B01F 27/053; B01F 27/1151; B01F 27/1155; B01F 27/118; B01F 27/191; B01F 27/27; B01F 27/50; B01F 27/55; B01F 27/85; B01F 27/86; B01F 27/93; B01F 33/8212; B01F 23/23123; B01J 19/008
USPC ......... 261/21, 28, 36.1, 37, 76, 84; 366/118, 366/302, 303
See application file for complete search history.

(56) References Cited

U.S. PATENT DOCUMENTS

| | | | |
|---|---|---|---|
| 4,923,644 A * | 5/1990 | Kuckens | B01F 35/93 261/92 |
| 2010/0270690 A1 | 10/2010 | Yokoi et al. | |
| 2018/0141837 A1* | 5/2018 | Kim | B01F 25/51 |

FOREIGN PATENT DOCUMENTS

| | | | | |
|---|---|---|---|---|
| JP | 5170409 B2 | 3/2013 | | |
| KR | 10-1996-0041699 A | 12/1996 | | |
| KR | 10-0949769 B1 | 3/2010 | | |
| KR | 10-1015477 B1 | 2/2011 | | |
| KR | 20100100315 A | * 2/2011 | ................ | A47K 7/00 |
| KR | 10-2012-0008106 A | 1/2012 | | |
| KR | 10-1176463 B1 | 8/2012 | | |
| KR | 10-2013-0104421 A | 9/2013 | | |
| KR | 10-2015-0012046 A | 2/2015 | | |
| KR | 10-1792157 B1 | 11/2017 | | |
| KR | 10-1947084 B1 | 2/2019 | | |

* cited by examiner

NANO-MICRO BUBBLE GENERATOR

TECHNICAL FIELD

The present invention relates to a nano-micro bubble generator.

BACKGROUND ART

Recently, as a variety of applicable fields and action effects of high-concentration gas-dissolved water (for example, oxygenic water, ozone-dissolved water, hydrogen-dissolved water, carbonated water, nitrogen-dissolved water, and the like) in which a gas-in-water rate is increased by dissolving a gas in water have become known, a variety of studies for a technology of dissolving a gas in a liquid have been performed. In addition, as a function of nano bubbles as a means for dissolving a gas and as a means for maintaining a dissolved state for a long time has become known, a study therefor has vigorously been performed.

In general, bubbles may be classified into mili bubbles, micro bubbles, micro-nano bubbles, and nano bubbles depending on diameters thereof. Micro bubbles refer to small bubbles having a diameter of ten to several tens of μm, and at least 30 μm. Micro-nano bubbles refer to fine bubbles having a diameter of several hundreds of nm to ten μm. Nano bubbles refer to ultra-fine bubbles having a diameter of several hundreds of nm or less.

Unlike mili bubbles which are general bubbles and which rise in water at a high speed and explode at the surface, nano bubbles receive less buoyancy due to a small volume thereof so as to rise to a surface at a very low speed and maintain a bubble state under water for a long time. Particularly, due to effects thereof such as a gas dissolution effect, a self-pressurization effect, an electrification effect, and the like, nano bubbles are highly applicable to a variety of fields of sewerage-related facilities, advanced water treatment facilities, land treatment, fishing and agricultural industries, effluent treatment washing, and the like.

RELATED ART DOCUMENT

Patent Document

Korean Patent Registration No. 10-1792157 (Nov. 1, 2017)

DISCLOSURE

Technical Problem

The present invention is directed to providing a nano-micro bubble generator which provides multiple collisions and friction with cavitation to a fluid and accelerates mixing and pulverizing of the fluid to generate ultra-fine bubbles.

Technical Solution

One aspect of the present invention provides a nano-micro bubble generator including a housing into or from which a fluid is flowable, a plurality of rotors rotatably coupled to an inside of the housing, and a plurality of stators fixed to the inside of the housing and alternately disposed with the plurality of rotors. Here, at least one of the rotors and the stators has a mesh structure in which a plurality of flow paths of the fluid are disposed in a lattice shape. Also, the rotors and the stators are adjacently arranged to generate collisions, friction, and cavitation caused by rotation of the rotors in the fluid, which flows through the flow paths, such that at least one of nano bubbles and micro bubbles are generated in the fluid.

Another aspect of the present invention provides a nano-micro bubble generator including a housing in which an inlet and an outlet are formed to allow a fluid to flow thereinto or therefrom, a bubble generation unit which includes a plurality of collision members installed on a movement path of the fluid inside the housing, configured to generate bubbles in the fluid according to collisions and friction with the fluid, and arranged to be spaced apart from each other, and a flow path disposed on at least one of an inside and an outside of the housing and configured to guide the bubbles in the fluid to be finely pulverized by stress generated during movement of the fluid.

Still another aspect of the present invention provides a nano-micro bubble generator including a fluid transfer unit configured to provide a flow force for transferring a fluid, a gas supply line configured to supply a gas, which differs from the fluid, to the fluid transferred by the flow force of the fluid transfer unit, a gas dissolution unit disposed on a transfer path of the fluid and configured to promote dissolution of the gas, which is supplied from the gas supply line, in the fluid, and a nano bubble unit configured to generate nano bubbles in the fluid transferred from the gas dissolution unit.

Advantageous Effects

According to the present invention, it is possible to more effectively generate nano bubbles by generating and finely pulverizing bubbles using a bubble generation unit and a flow path.

DESCRIPTION OF REFERENCE NUMERALS

Figure 1:
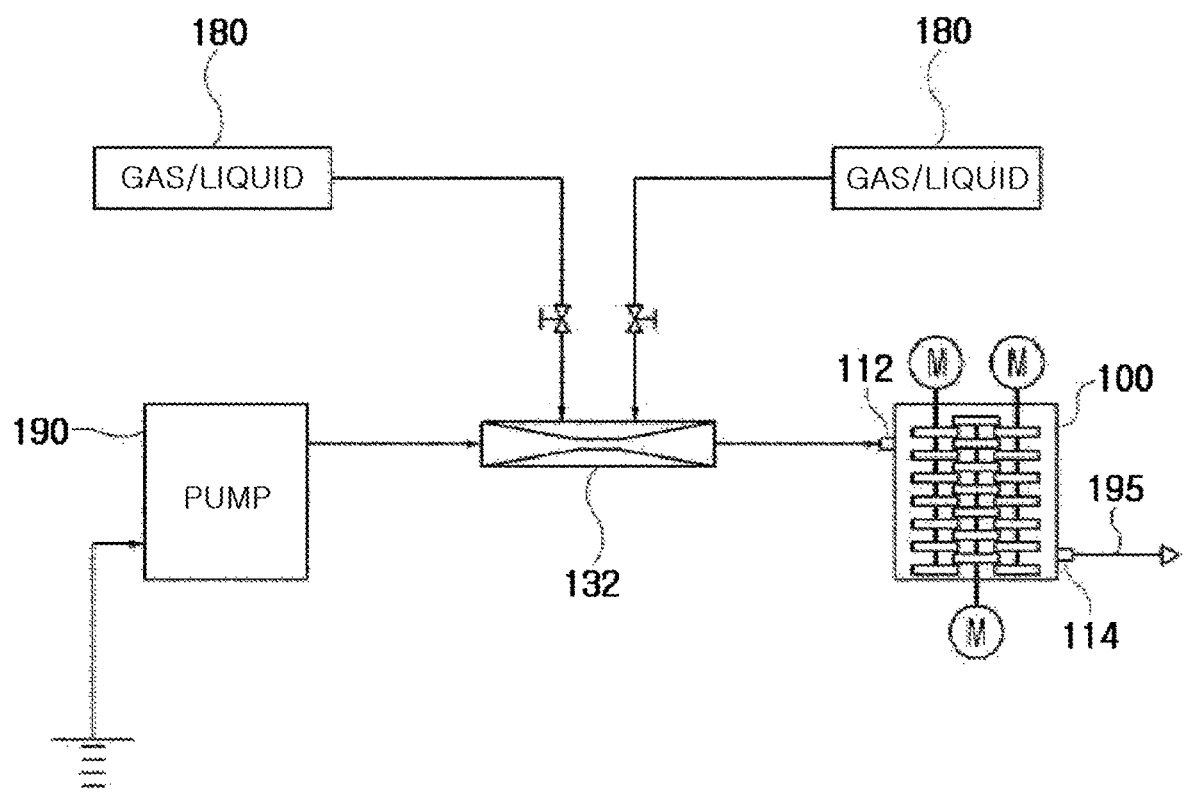
FIGS. 1 and 2 are views of a nano-micro bubble generator according to one embodiment of the present invention.

10: fluid
30: fluid supply source
100: nano-micro bubble generator
110: housing
120: bubble generation unit
122: first collision member (rotor)
124: second collision member (stator)
125: lateral bar 126: longitudinal bar
127: opening portion
130: flow path
140: rotational shaft
150: rotor blade
160: driving unit
170: chamber
180: gas supply line
190: fluid transfer unit
200: gas dissolution unit
210: pipe
220: mixing member

MODES OF THE INVENTION

Since the present invention may be variously modified and have a variety of embodiments, particular embodiments will be illustrated in the drawings and described in detail hereinafter. However, these are not intended to limit the present invention to a particularly disclosed form and it should be understood that the present invention includes all changes, equivalents, and substitutes included within the concept and technical scope of the present invention. In a description of the embodiments of the present invention, a detailed description of well-known components or functions of the related art will be omitted when it is deemed to obscure understanding of the embodiments of the present invention.

The terms such as first, second, and the like may be used to describe a variety of components, and the components are not limited to the terms. The terms are used only for distinguishing one component from another.

The terms used herein are used merely for describing particular embodiments and are not intended to limit the present invention. Singular expressions, unless clearly defined otherwise in context, include plural expressions. Throughout the application, the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Hereinafter, embodiments of a nano-micro bubble generator 100 according to the present invention will be described in detail with reference to the attached drawings. In a description with reference to the attached drawings, equal or corresponding components will be referred to with the same reference numerals and a repetitive description thereof will be omitted.

FIG. 1 illustrates components of the nano-micro bubble generator 100 according to the present invention. The nano-micro bubble generator 100 may provide nano-micro bubbles which are generated by supplying, mixing, and dissolving at least one gas selected from a gas group consisting of, for example, air, oxygen ($O_2$), nitrogen ($N_2$), ozone ($O_3$), carbon dioxide ($CO_2$), and the like in water (or liquid). Referring to FIG. 1, the nano-micro bubble generator 100 according to the present invention may include the nano-micro bubble generator 100 using a relative rotation principle of a rotor 122 and a stator 124. The nano-micro bubble generator 100 may allow a gas mixed in a fluid 10 to be better dissolved in the fluid 10 as well as allowing the gas to be further finely pulverized using an effect of collision and friction generated by relative rotation of the rotor 122 and the stator 124.

In the present invention, water (or a liquid) provided to the nano-micro bubble generator 100 is supplied by a pump, and at least a part of a pipe conduit which connects the pump to the nano-micro bubble generator 100 may be configured as a venturi tube structure formed to have an inlet and an outlet, which are wide, and a relatively narrow inside (hereinafter, referred to as a venturi portion 132). Also, being diverged from the pipe conduit, one or more gas/liquid supply portions may be connected to one side of the venturi portion 132 to mix a certain gas (or liquid, for example, a catalyst and the like) with water (or a liquid) inside the pipe conduit.

In this configuration, a flow rate of the water (or liquid) supplied by the pump rapidly increases while passing through the venturi portion 132 and a gas (or liquid) supplied from a gas supply line 180 is self-primed into the venturi portion 132 due to a strong suction force caused by an increase in the flow rate and is mixed with the water (or liquid) inside the pipe conduit. The fluid 10 formed by mixing the water (or liquid) with the gas (or liquid) as described above flows into the nano-micro bubble generator 100, is more minutely mixed, and then flows along a discharge pipe conduit 195.

As described above, the present invention may process the fluid 10 from a small amount to a large amount thereof by modularizing a bubble generation and gas mixing system, may reduce a gas injection amount by increasing a gas-in-water rate of a gas selected from a group consisting of air, oxygen, hydrogen, ozone, and the like, and may miniaturize a gas generator such as an oxygen generator, a hydrogen generator, an ozone generator, or the like.

Figure 2:
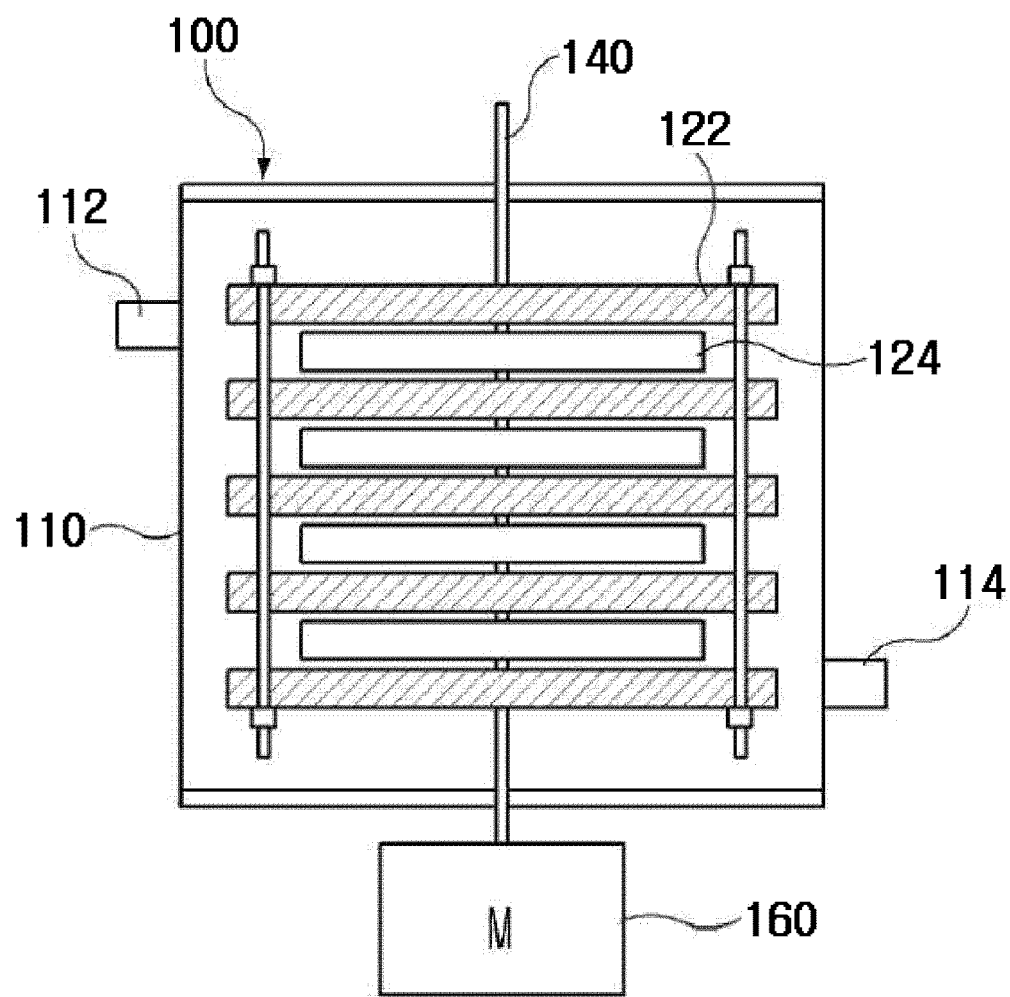

FIG. 2 illustrates a first embodiment of the nano-micro bubble generator 100 of FIG. 1 which has a surface-contact single-axial mesh type rotator 122. In a housing 110 of the nano-micro bubble generator 100, a plurality of such rotors 122 which rotate on a shaft of a motor and a plurality of such stators 124 which are fixed to an inner wall of the housing 110 and face each of the rotors 122 at a certain interval are provided. Here, the rotors 122 and the stators 124 may be provided in a mesh structure including a plurality of opening portions 127 to allow the fluid 10 to pass therethrough, and each of the opening portions 127 may have an adequate size to allow the fluid 10 to pass therethrough. Also, an interlayer distance between the rotor 122 and the stator 124 may adequately allow the fluid 10 to escape while maintaining a state in which surfaces of the rotor 122 and the stator 124 substantially or approximately come into contact with each other.

In the above configuration, the fluid 10 which flows in through an inlet 112 provided on one side of the housing 110 generates cavitation as well as multistage repetitive collisions and friction between the rotors 122 and the stators 124 due to relative rotation of the rotors 122 and the stators 124 while the motor is driven. Also, the collisions and friction may allow a gas to be better dissolved in the fluid 10 as well as further atomize molecules of water (or a liquid) so as to adjust and increase generation of nano-micro bubbles of at least from several nanometers (nm) to several tens of micrometers (μm).

Meanwhile, the number of motor shafts on which the plurality of rotors 122 are installed at certain intervals may be two or three or more installed in the housing 110 as an internal space of the housing 110 allows.

As an example of the nano-micro bubble generator 100 including a surface-contact twinaxis mesh type rotor 122, in the housing 110 of the nano-micro bubble generator 100, shafts of a motor are arranged in two rows and a plurality of such rotors 122 to be rotated simultaneously with driving of the motor may be installed on each of the shafts of the motor at a certain interval along an axial line. Here, an interlayer distance between the motor shafts may be formed so as to allow the rotors 122 arranged on each shaft to be alternately insertable. The rotors 122 arranged on each shaft are maintained such that at least some thereof are inserted between the rotors 122 arranged on the opposite shaft to vertically face each other. In this state, an interlayer distance between the rotors 122 which face each other may be formed to allow the fluid 10 to escape therethrough while allowing surfaces of the vertically facing rotors 122 to substantially or approximately come into contact with each other. As another example, the rotors 122 may be arranged in parallel while being spaced apart from each other, and the housing 110 may have a variety of external shapes such as a circular shape, a quadrangular shape, and the like.

In the above configuration, the fluid 10 which flows in through the inlet 112 provided on one side of the housing 110 generates cavitation as well as multistage repetitive collisions and friction between the rotors 122 and the stators 124 due to relative rotation of the rotors 122 and the stators 124 while the motor is driven. The collisions and friction may allow a gas to be better dissolved in the fluid 10 as well as further atomizing water molecules in the fluid 10 so as to generate micro or nano-sized ultra-fine bubbles.

Figure 4:
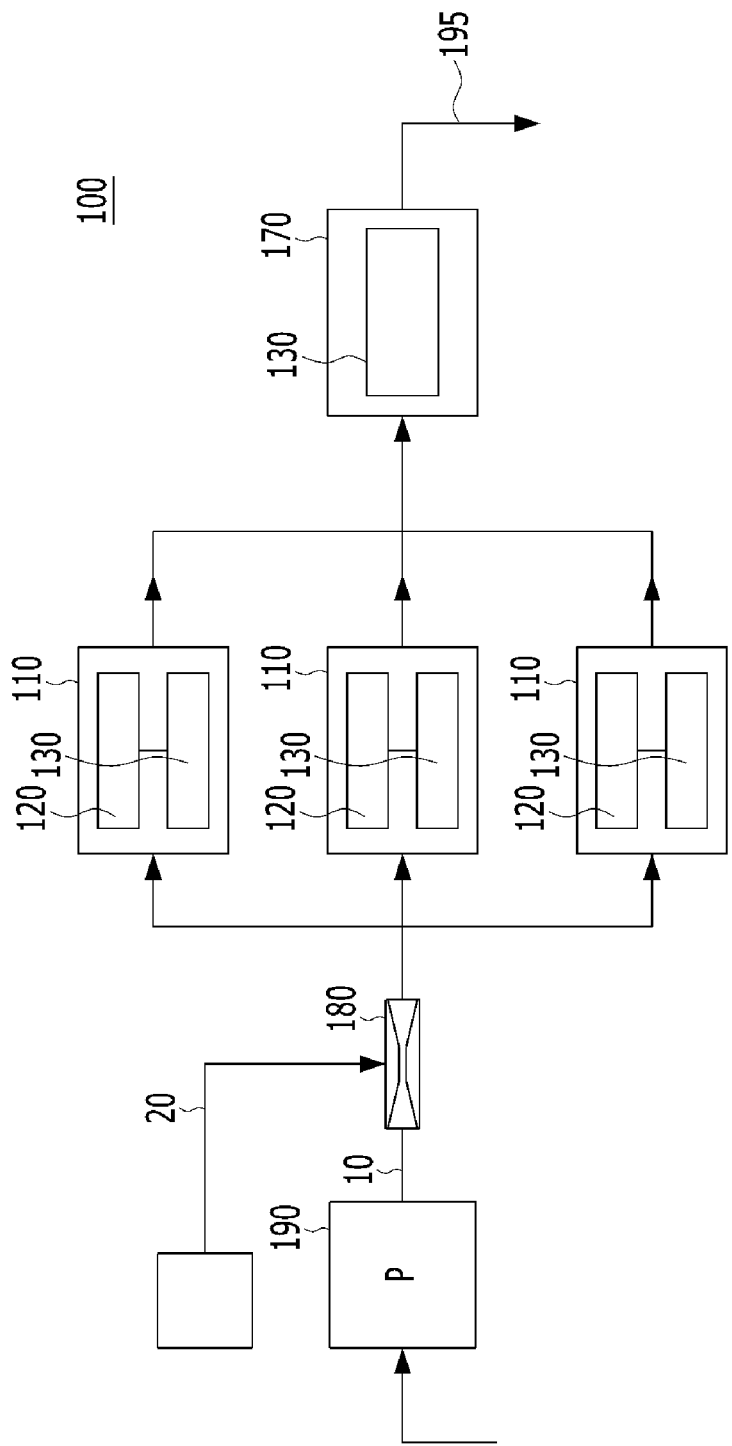
FIG. 4 is a view illustrating a structure of a chamber according to another embodiment of the present invention.
Figure 5:
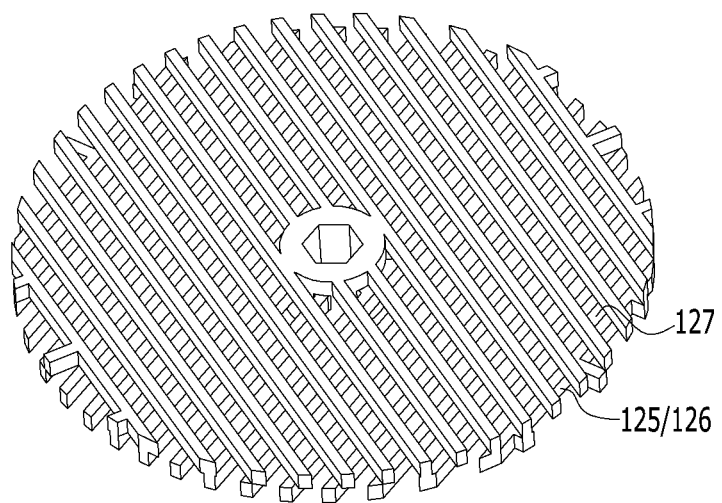
FIG. 5 is a view illustrating a mesh structure of the nano-micro bubble generator according to one embodiment of the present invention.
Figure 6:
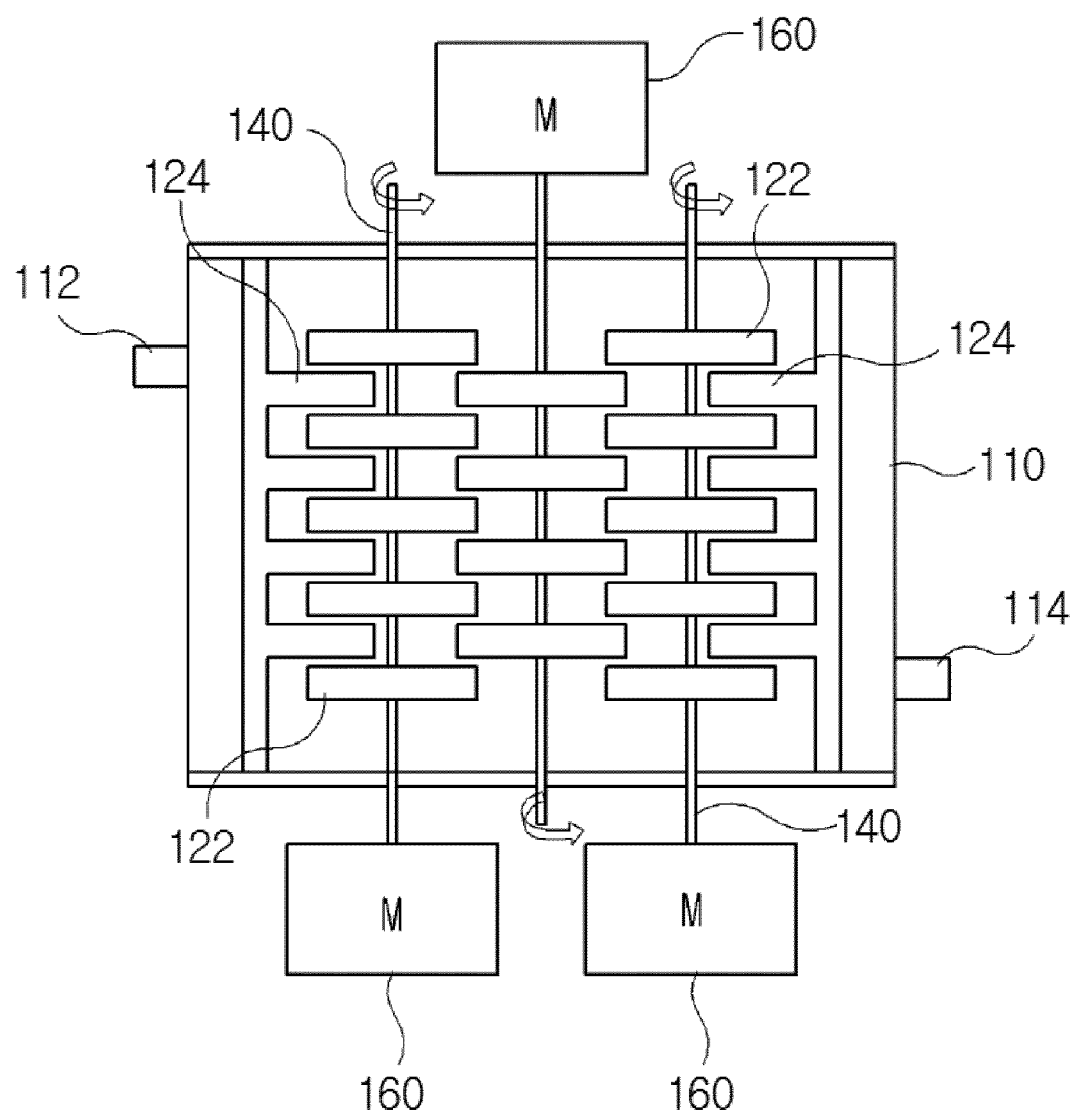
FIG. 6 is a view of a nano-micro bubble generator according to another embodiment of the present invention.
Figure 7:
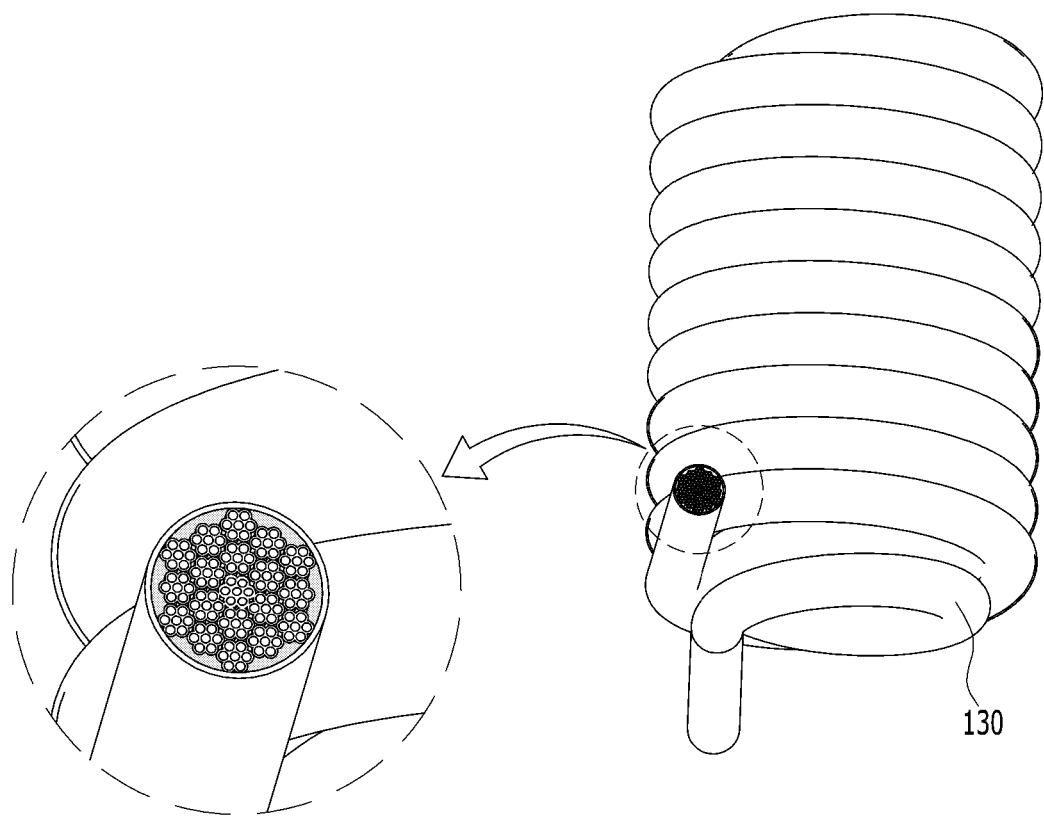
FIGS. 7 to 9 are views illustrating a flow path structure of according to another embodiment of the present invention.
Figure 8:
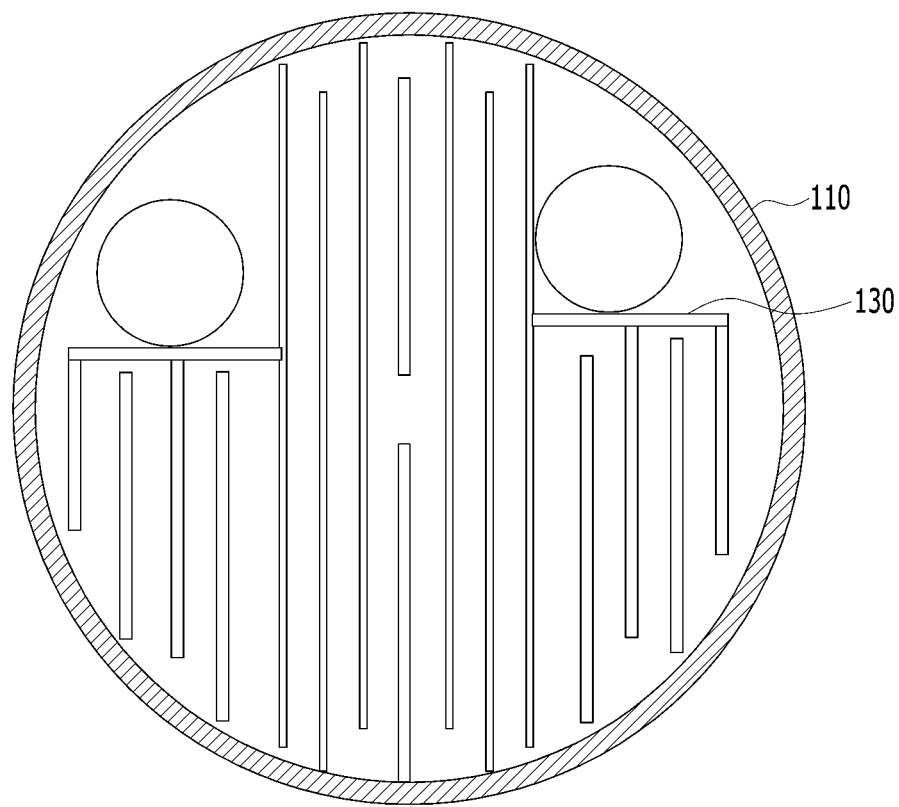

FIG. 4 illustrates a mesh structure of the rotors 122 and the stators 124 which may be provided in the nano-micro bubble generator 100. It may be seen that the mesh structure of the rotors 122 and the stators 124 forms a lattice form having a flat plane structure. Also, it may be seen that the mesh structure of the rotors 122 and the stators 124 forms a lattice structure in which a lateral bar 125 and a longitudinal bar 126 are unevenly stepped with a uniform height difference. The fluid 10 may collide with the lateral bar 125 and the longitudinal bar 126 while passing through the opening portions 127 of the latticed mesh. During this process, collisions and friction are generated by relative rotation of the rotors 122 and the stators 124 such that the gas may be better dissolved in the fluid 10. Simultaneously, water molecules in the fluid 10 are further atomized to generate micro or nano-sized ultra-fine bubbles. Meanwhile, although the latticed mesh structure is shown in the drawings, the present invention is not limited thereto and may provide mesh structures having a variety of shapes such as a honey comb shape, a triangular shape, a pentagonal shape, and the like.

As a modified shape of the rotor 122, the rotor 122 may have rotor blades which extend from a circumferential surface of a motor shaft in respective directions and have a single-layer structure. The rotor blades may have a shape with a width from a top end to a bottom end of the motor shaft and have a uniform curvature with respect to a rotation direction. In this case, the stators 124 may be arranged in positions spaced at a certain interval from the rotors 122 in a vertical direction. Surfaces of the rotor blades and the stators 124 may have a stepped lattice structure or other mesh structures having a variety of shapes.

Also, the rotors 122 may be provided in a multilayer structure in which at least two rotor blades extend in respective directions of the motor shaft at a vertically uniform interval along the circumferential surface of the motor shaft. In this case, a vertical separation distance between rotor blades of the rotor 122 may be formed as an interval which allows the rotors 122 to be insertion-couplable to each other or allows the rotor 122 and the stator 124 to be insertion-couplable to each other. Also, in addition to the above-described shapes, the rotor 122 may have a structure having general turbo type rotor blades or screw propeller type rotor blades or a brush type structure including a plurality of needle-shaped members.

Figure 3:
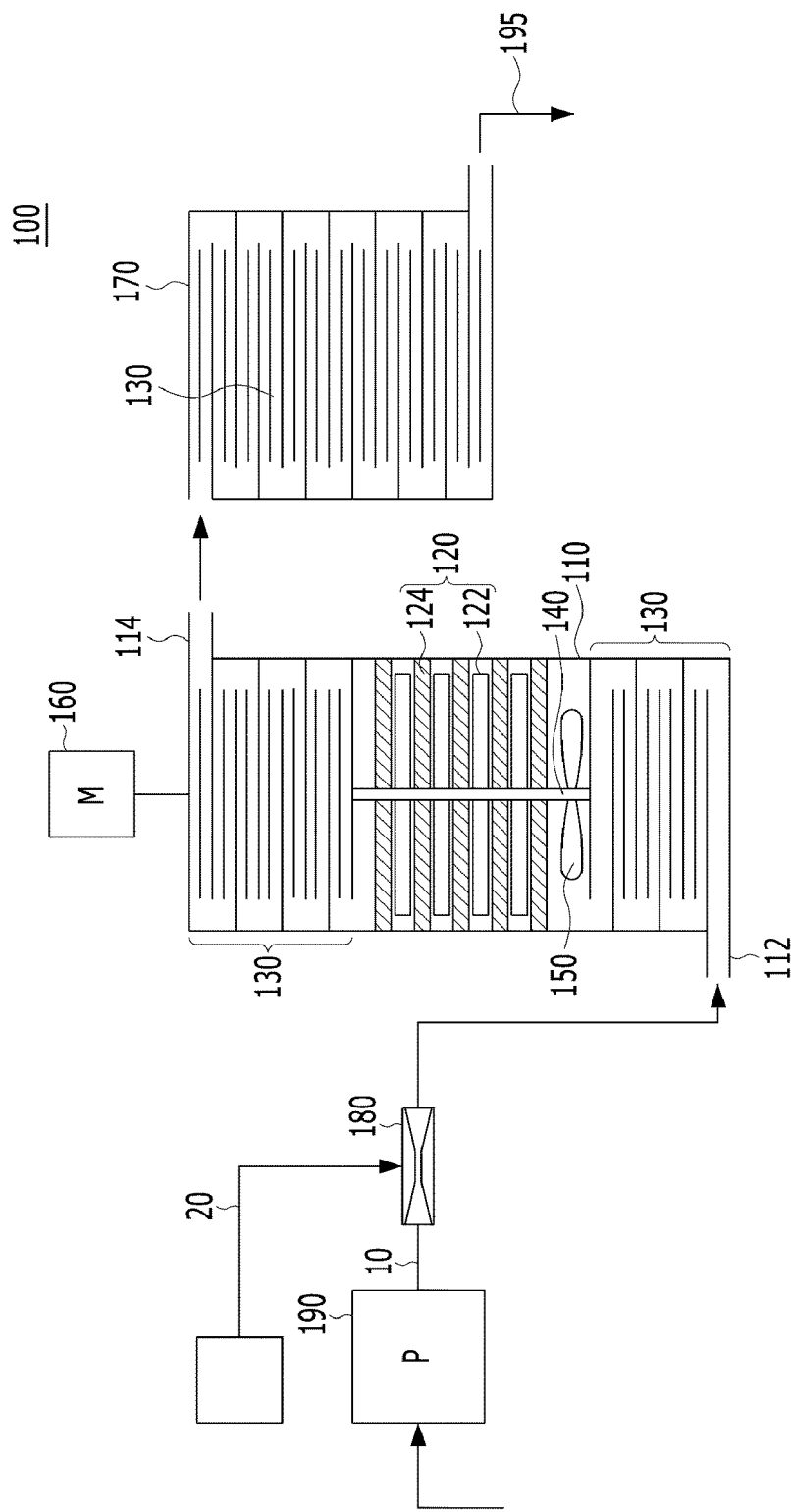
FIG. 3 is a view of a nano-micro bubble generator according to another embodiment of the present invention.

According to another embodiment of the present invention, as shown in FIG. 3, as an apparatus which generates nano bubbles by supplying, mixing, and dissolving at least one gas selected from a gas group consisting of air, oxygen, nitrogen, ozone, carbon dioxide, and the like in the fluid 10 such as water and the like, there is provided a nano-micro bubble generator 100 including the housing 110, a bubble generation unit 120, a collision member 121, a flow path 130, a rotational shaft 140, rotor blades 150, a driving unit 160, a chamber 170, a gas supply line 180, a pump, and the discharge pipe conduit 195.

According to the embodiment, fine bubbles may be primarily generated in the fluid 10 using the bubble generation unit 120 installed in the housing 110. Subsequently, bubbles may be finely pulverized by allowing the fluid 10 to secondarily pass through the flow path 130 so as to effectively generate nano bubbles in the fluid 10.

The housing 110 has a configuration in which the inlet 112 and an outlet 114 are formed to allow the fluid 10 to flow thereinto and therefrom as shown in FIG. 3. The fluid 10 may flow into the inlet 112 of the housing 110 due to a driving force of the pump. The gas supply line 180 which supplies a different type of fluid 20 which differs from the fluid 10 and has a gaseous or liquid state to the fluid 10 supplied to the housing 110 may be disposed between the pump and the inlet 112 of the housing 110.

The gas supply line 180 may be, for example, formed as the venturi tube structure (venturi portion 132) which has a wide inlet and a wide outlet and a relatively narrow inside as shown in FIG. 3. Also, a tank for the different type fluid 20 may be connected to one side of the venturi portion 132 so as to mix the different type fluid 20 (a gas such as air, oxygen, nitrogen, ozone, carbon dioxide, or the like or a liquid such as a catalyst or the like) with the fluid 10 supplied to the housing 110.

As shown in FIG. 3, the bubble generation unit 120 may include a plurality of collision members 121, that is, a plurality of first collision members 122 and a plurality of second collision members 124 installed on a movement path of the fluid 10 in the housing 110 to generate bubbles in the fluid 10 according to collisions or friction of the fluid 10 and arranged to be spaced apart from each other.

In this case, at least some of the plurality of collision members 121 may be plate-shaped members. That is, as shown in FIG. 3, the first collision members 122 and the second collision members 124 may have plate shapes and be alternately arranged.

Also, at least some of the plurality of collision members 121 may have a mesh structure including the plurality of opening portions 127 to allow the fluid 10 to pass therethrough. In the case of the embodiment, as an example, both the first collision members 122 and the second collision members 124 are mesh type in which the opening portions 127 are formed.

As described above, the plurality of collision members 121 including the first collision members 122 and the second collision members 124 are arranged in the housing 110 such that the fluid 10 which flows into the housing 110 causes collisions and friction to the first collision members 122 and the second collision members 124 so as to generate fine bubbles in the fluid 10.

Meanwhile, as shown in FIG. 3, in the housing 110, rotational shafts 140 are arranged in a longitudinal direction such that both ends thereof may be rotatably installed in the housing 110. At least some of the plurality of collision members 121, in detail, the first collision members 122 may be coupled to the rotational shafts 140 and rotate with the rotational shafts 140, and the second collision members 124 may be a fixed type and fixedly installed in the housing 110.

As described above, the first collision members 122 coupled to the rotational shafts 140 may rotate due to a driving force of the rotor blades 150 or the driving unit 160. First, as shown in FIG. 3, the driving unit 160 such as a motor or the like may be coupled to the rotational shafts 140 so as to rotate the first collision members 122 using power thereof. In this case, a rotation speed of the first collision members 122 may be adjusted using a speed adjustor including a gear box, an inverter, or the like so as to adjust a size and/or a generated amount of bubbles.

Also, the first collision member 122 may be rotated using a non-powered method without using the driving unit 160. As shown in FIG. 3, the rotor blades 150 may be installed on an end of the rotational shaft 140. The rotor blades 150 may rotate at least some of the plurality of collision members 121, that is, the first collision members 122 using a flow force of the fluid 10 which flows into the housing 110. In this case, the fluid 10 may transfer the flow force to the first collision members 122 through an axial flow, a lateral flow, or a diagonal flow.

As described above, the embodiment may be operated in two modes including the non-powered method using the rotor blades 150 and a powered method using the driving unit 160. When the non-powered method is used, an advantage of reducing driving energy is present. When the powered method is used, it is possible to actively control a size, a generated amount, and the like of bubbles so as to generate high-quality nano bubbles.

Meanwhile, although the rotor blades 150 are primarily used for rotating the first collision members 122 as described above, the rotor blades 150 may also perform a secondary function of generating bubbles in the fluid 10 according to collisions or friction of the fluid 10 so as to generate nano bubbles more abundantly.

In the case of the embodiment, the first collision members 122 may be configured as the rotors 122 and the second collision members 124 may be configured as the stators 124 so as to more effectively generate nano bubbles. In more detail, since the first collision members 122 and the second collision members 124 may have mesh structures having opening portions 127 and are arranged at relatively small intervals to allow surfaces thereof facing each other to maintain a state of substantially or nearly being in contact, the fluid 10 which passes through the first collision members 122 and the second collision members 124 causes collisions and friction with the first collision members 122 and the second collision members 124 simultaneously while cavitation may occur in the fluid 10 due to rotation of the first collision members 122.

As shown in FIG. 3, the flow path 130 may be disposed on at least one of the inside and the outside of the housing 110 so as to induce bubbles in the fluid 10 to be finely pulverized by stress generated during movement of the fluid 10.

In a process in which the fluid 10 passes through the flow path 130, friction with a surface of the flow path 130 occurs, and for example, shear stress occurs in the fluid 10 such that a flow separation phenomenon may occur on a boundary layer and bubbles in the fluid 10 may be further finely pulverized to be nano bubbles.

As shown in FIG. 3, the flow path 130 may be formed to have a zigzag structure (a zigzag path in a vertical direction, a zigzag path in the same plane, or a path to which both thereof are applied are possible), may have an adequately long length to allow stress to appropriately occur in the fluid, and may have an adequately small sectional area to smoothly induce occurrence of stress in the fluid 10.

The flow path 130 may be formed inside the housing 110 and disposed after the bubble generation unit 120 on the basis of a movement path of the fluid 10. Accordingly, bubbles which are primarily generated in the fluid 10 by the bubble generation unit 120 may be secondarily finely pulverized while passing through the flow path 130 so as to consequently generate abundant high-quality nano bubbles.

Also, the flow path 130 may be separately provided outside the housing 110. As shown in FIG. 3, the chamber 170 may be connected to the outlet 114 of the housing 110, and the flow path 130 may be formed inside the chamber 170. In this case, as described above, as the fluid 10 which has gone through the first and second treatments is tertiarily treated by the flow path 130 inside the chamber 170, ultra-fine bubbles which have already been formed may be stabilized and nano bubbles may be more effectively generated.

Meanwhile, as shown in FIG. 3, the flow path 130 may be disposed before the bubble generation unit 120 on the basis of the movement path of the fluid 10. As described above, the flow path 130 may be disposed before the bubble generation unit 120 and the fluid 10 which flows into the housing 110 may be pretreated using shear stress generated until passing the boundary layer of the surface of the flow path 130 so as to more smoothly generate and finely pulverize bubbles.

As shown in FIG. 2, an outer shell may be formed to have a larger size (diameter) than that of an inner shell to accommodate the inner shell therein. Also, the flow path 130 may be formed in a space between the inner shell and the outer shell. For example, the flow path 130 may be formed to have a spiral structure along an outer wall of the inner shell.

Since the inlet 112 is formed in the inner shell and the outlet 114 is formed in the outer shell, the fluid 10 which flows into the inlet 112 of the inner shell may fill and flow over the inner shell through a top of the inner shell, pass through the flow path 130, and be discharged outward from the housing 110 through the outlet 114 of the outer shell.

Also, the chamber 170 inside which the flow path 130 is formed may be disposed on each of a front end and a rear end of the housing 110 to be connected to each of the inlet 112 and the outlet 114. Accordingly, according to the embodiment, the fluid 10 which is supplied by the pump and passes through the gas supply line 180 may be primarily pretreated in the chamber 170, flow into the housing 110, pass through the flow path 130 formed below the housing 110 and the bubble generation unit 120 formed thereabove, be discharged outward from the housing 110, and ultimately pass through the chamber 170 once more so that bubbles may be generated and finely pulverized so as to consequently generate nano bubbles.

Also, as another example, the device may be simplified by omitting the driving unit 160 and a driving cost for the device may be significantly reduced due to not using power for rotating the first collision members 122, and thus the device becomes advantageous in maintenance/repair.

Also, as another example, a plurality of such housings 110 may be connected in parallel. That is, the fluid 10 which passes the pump and the gas supply line 180 may branch into and be supplied to the plurality of housings 110. Since the bubble generation unit 120 and the flow path 130 are formed in each of the housings 110, fine bubbles may be generated according to composite actions of collisions, friction, and cavitation as described above. Subsequently, the fluids 10 discharged from the outlets 114 of the housings 110 are collected as one and supplied to the chamber 170 including the flow path 130 so as to consequently finely pulverize bubbles.

Accordingly, the housings 110 (the bubble generation unit 120 and the flow path 130) may be provided again and arranged in parallel so as to further improve nano bubble generation efficiency. Also, in a modified form of the embodiment, the housing 110 and the chamber 170 may be arranged in parallel and the plurality of housings 110 (including the bubble generation unit 120) may be connected in a series, or a plurality of such chambers 170 (including the flow path 130) may be connected in a series or in parallel.

An inner wall of the housing 110 may have an uneven structure including a plurality of protrusions or have a mesh structure including a plurality of concave portions along a wall surface. In addition, the inner wall of the housing 110 may have a spiral structure including a plurality of spiral grooves formed along a wall surface of the inner wall.

In this case, in the fluid 10 which flows in through the inlet 112 provided on one side of the housing 110, a gas-in-water rate of a gas may be further increased and bubbles may be further finely pulverized by collisions and friction of the protrusions, the concave portions, or the spiral grooves in addition to the bubble generation unit 120 and the flow path 130 so as to more effectively generate nano-sized ultra-fine bubbles.

In the fluid 10 which flows into the housing 110, the gas-in-water rate of a gas in the fluid 10 may be further increased due to an effect of collisions and friction caused by the bubble generation unit 120 and the flow path 130 and an increase in a pressure according to reduction of an inner diameter such that the fluid 10 may be much further finely pulverized so as to promote generation of nano bubbles.

The fluid 10 collides with the lateral bars 125 and the longitudinal bars 126 while passing through the opening portions 127 having a latticed mesh. Here, since the collisions and friction of the fluid 10 may be promoted by relative rotation of the first collision members 122 and the second collision members 124, particles of the fluid 10 may be further atomized such that nano bubbles may be effectively generated so as to significantly increase the gas-in-water rate.

The discharge pipe conduit 195 of the nano-micro bubble generator 100 may include collision units having a certain shape on at least a part thereof to further decrease a size of particles of the fluid 10. The collision units may be provided as a structure which has a diameter gradually increasing in a flow direction of the fluid 10 or in which a plurality of panel layers are arranged. Inside the discharge pipe conduit 195, both ends of the collision units are at least spaced at a certain interval apart from an inner wall of the discharge pipe conduit 195 to allow the fluid 10 to flow along the discharge pipe conduit 195.

The collision unit may include a body portion having a structure with a diameter gradually increasing in a flow direction and a plurality of partitions radially extending from a surface of the body portion at certain intervals and connected to an inner surface of the discharge pipe conduit 195. Here, through holes having a certain size to allow the fluid 10 to pass therethrough may be formed between the partitions. Also, the collision unit may include a body portion having a structure with a diameter gradually increasing in a flow direction and spiral grooves or spiral protrusions formed on a surface of the body portion along a longitudinal direction. Also, the collision unit has a shape in which a plurality of panel layers are arranged inside the discharge pipe conduit 195. Here, a plurality of protrusions having a variety of shapes may be formed on top and bottom surfaces of each of the panel layers.

Figure 10:
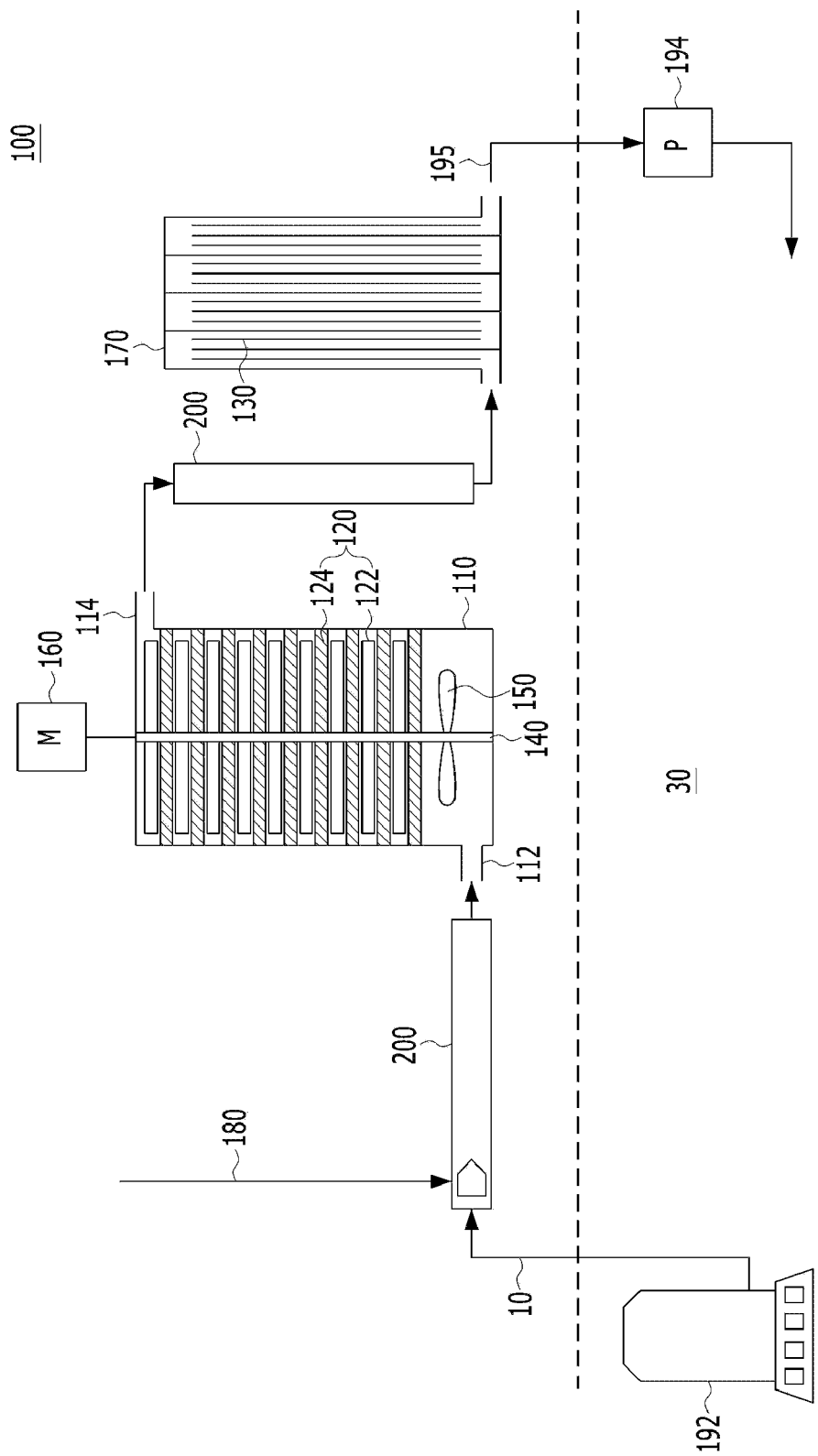
FIGS. 10 and 11 are views of a nano-micro bubble generator according to still another embodiment of the present invention.
Figure 11:
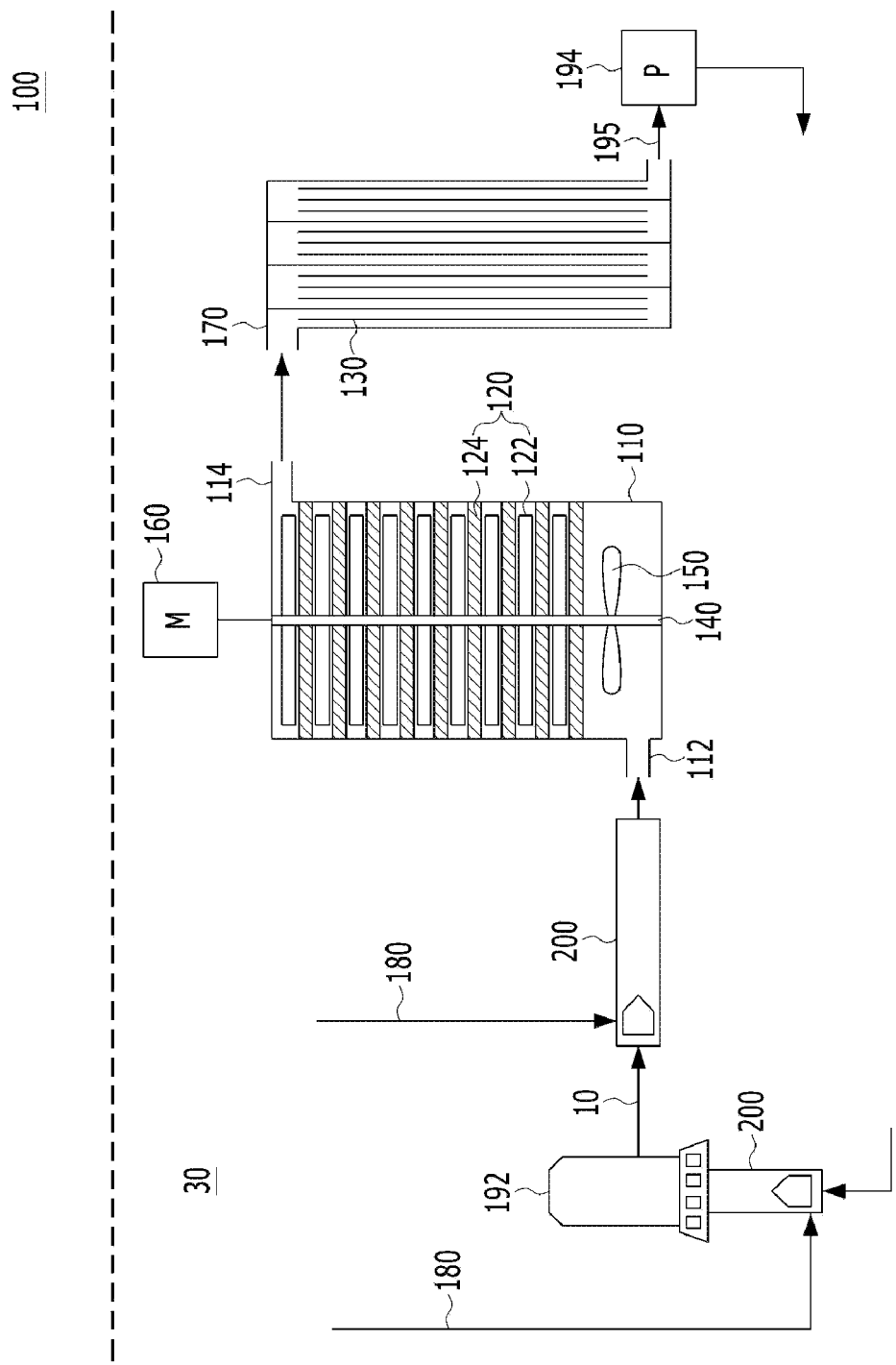

According to still another embodiment of the present invention, as shown in FIG. 10, as an apparatus which generates nano bubbles by supplying, mixing, and dissolving at least one gas selected from a gas group consisting of air, oxygen, nitrogen, ozone, carbon dioxide, and the like in the fluid 10 such as water and the like, there is provided a nano-micro bubble generator 100 including the housing 110, the bubble generation unit 120, the flow path 130, the rotational shaft 140, the rotor blades 150, the driving unit 160, the chamber 170, the gas supply line 180, a fluid transfer unit 190, the discharge pipe conduit 195, and a gas dissolution unit 200.

According to the above embodiment, as pretreatment before nano bubbles are generated using a nano bubble unit, dissolution of a gas in the fluid 10 may be promoted using the gas dissolution unit 200 so as to more effectively generate nano bubbles.

Also, an underwater feeding pump 192 may be used as the fluid transfer unit 190 so as to effectively generate a large amount of nano bubbles using less energy in comparison to a case of using an intake pump.

The fluid transfer unit 190 may provide a flow force for transferring the fluid 10. As shown in FIG. 10, the fluid transfer unit 190 may include the underwater feeding pump 192 and an underwater circulating pump 194.

The underwater feeding pump 192 may be installed to be submerged under a fluid supply source 30 which supplies the fluid 10, for example, a water tank, a river, a lake, and the like filled with the fluid 10, for example, water or the like. As described above, underwater equipment located in the fluid supply source 30 may be installed on a buoy, a barge, or the like, and the other following components may be stably installed using a buoy or barge in the same way when located in the fluid supply source 30.

A flow force may be provided to the fluid 10 using the underwater feeding pump 192 so as to operate the equipment with low power in comparison to a case of using an intake pump. Accordingly, economic feasibility in nano bubble generation may be maximized.

As shown in FIG. 10, the underwater circulating pump 194 may be installed to be submerged under the fluid supply source 30 and may circulate the fluid 10 discharged from the nano bubble unit in the fluid supply source 30. That is, as shown in FIG. 10, the underwater circulating pump 194 may be disposed on both ends of an entirety of the equipment to face the underwater feeding pump 192 such that the fluid 10 discharged from the nano bubble unit is diffused at a long distance so as to induce more effective circulation of the fluid 10.

Diffusion and circulation of the fluid 10 may be induced using the underwater circulating pump 194 so as to more uniformly diffuse and disperse a gas such as oxygen, ozone, and the like included in nano bubbles of the fluid 10 in the fluid supply source 30.

In the case of the embodiment, all other components except the underwater feeding pump 192 and the underwater circulating pump 194 may be installed on the ground to be operated.

As shown in FIG. 10, the gas supply line 180 may supply a gas (such as air, oxygen, nitrogen, ozone, carbon dioxide, and the like) different from the fluid 10 to the fluid 10 which is transferred by a flow force of the fluid transfer unit 190.

As shown in FIG. 10, an airstone may be coupled to one end of the gas supply line 180 so as to more uniformly discharge a gas, and a gas tank which stores the corresponding gas may be connected to the other end of the gas supply line 180.

In more detail, as shown in FIG. 10, the gas supply line 180 may be connected to an inlet of a pipe 210 of the gas dissolution unit 200 so as to supply a gas toward an outlet of the pipe 210.

As described above, the gas supply line 180 may be connected to the inlet of the pipe 210 and an end thereof may be disposed to face the outlet of the pipe 210 such that the gas supplied by the gas supply line 180 may be quickly mixed with the fluid 10 according to a flow of the fluid 10 and be more effectively dissolved in the fluid 10.

As shown in FIG. 10, the gas dissolution unit 200 may be disposed on a transfer path of the fluid 10 to promote dissolution of a gas supplied from the gas supply line 180 in the fluid 10. In more detail, the gas dissolution unit 200 may be connected to the underwater feeding pump 192, and the above-described gas supply line 180 may be connected to an inlet of the gas dissolution unit 200.

Also, a plurality of such gas dissolution units 200 may be arranged along the transfer path of the fluid 10. In detail, as shown in FIG. 10, another gas dissolution unit 200 may be interposed between the outlet 114 of the housing 110 and the flow path 130 and uniformly disperse bubbles primarily generated by the bubble generation unit 120 so as to further increase nano bubble generation efficiency.

As shown in FIG. 10, the gas dissolution unit 200 may include the pipe 210 disposed on the transfer path of the fluid 10 and a mixing member 220 disposed in the pipe 210 and configured to have a particular structure and mechanism to mix a gas with the fluid 10.

The nano bubble unit may generate nano bubbles in the fluid 10 transferred from the gas dissolution unit 200. As shown in FIG. 10, the nano bubble unit may include the housing 110, the bubble generation unit 120, the rotational shaft 140, the rotor blades 150, the driving unit 160, the chamber 170, and the flow path 130.

The housing 110 has a configuration in which the inlet 112 and an outlet 114 are formed to allow the fluid 10 to flow thereinto and therefrom as shown in FIG. 10. The fluid 10 may pass through the gas dissolution unit 200 and flow into the inlet 112 of the housing 110 due to a driving force of the fluid transfer unit 190.

As shown in FIG. 10, the bubble generation unit 120 may include the plurality of collision members 121, that is, the plurality of first collision members 122 and the plurality of second collision members 124 installed on a movement path of the fluid 10 in the housing 110 to generate bubbles in the fluid 10 according to collisions or friction of the fluid 10 and arranged to be spaced apart from each other.

Meanwhile, the bubble generation unit 120 may include the housing 110 and the plurality of collision members 121 of FIG. 2 which are accommodated in the housing. Here, as shown in FIG. 2, the collision members 121 may be formed to have a structure having a maximized surface area due to a plurality of wrinkles formed by bending a plate-shaped member a plurality of times. For example, the collision member 121 may include a material having hardness through sintering such as polyvinyl chloride (PVC) and the like. Also, the collision member 121 may include a plurality of nano-sized openings (or holes) in a surface thereof.

As described above, the surface area of the collision member 121 may be maximized and nano openings or nano holes are formed in the surface thereof so as to cause collisions or friction between the collision member 121 and the fluid 10 which flows into the housing 110 and to generate abundant nano bubbles in the fluid 10.

In this case, a plurality of such bubble generation units 120 may be disposed. Here, one of the bubble generation units 120 may include the first collision member 122 and the second collision members 124 as shown in FIG. 2 and another may include the housing 110 filled with the plurality of collision members 121 as shown in FIG. 1. The bubble generation unit 120 filled with the plurality of collision members 121 may be selectively installed on a front end, a rear end, or both front and rear ends of the bubble generation unit 120 including the first collision members 122 and the second collision members 124.

The flow path 130 may be disposed on at least one of the inside and the outside of the housing 110 so as to induce bubbles in the fluid 10 to be finely pulverized by stress generated during movement of the fluid 10.

Also, a variety of feeding pumps which are not an underwater pump may be used as the fluid transfer unit 190. The fluid transfer unit 190 may be installed on the ground outside the fluid supply source 30 and does not include an additional underwater circulating pump 194.

Also, the gas dissolution unit 200 may be connected to each of front and rear ends of the fluid transfer unit 190. The gas supply line 180 may be connected to the inlet of the gas dissolution unit 200 coupled to the front end of the fluid transfer unit 190 to supply a gas thereto, and a gas may not be additionally injected into the gas dissolution unit 200 connected to the rear end of the fluid transfer unit 190.

Also, in the case of the embodiment, an additional flow path 130 may not be formed. That is, the additional flow path 130 is not formed inside and outside the housing 110. Although the flow path 130 is not present as described above, it is possible to generate abundant nano bubbles through interaction between the bubble generation unit 120 and the gas dissolution unit 200 installed on the front and rear ends of the fluid transfer unit 190.

As another example, an entirety of the equipment including the fluid transfer unit 190 may be installed under the water to be submerged under the fluid supply source 30. As described above, the underwater equipment may be installed on a buoy or a barge.

In this case, the gas dissolution unit 200 disposed on a front end of the underwater feeding pump 192 may have a central shaft 221 connected to a motor shaft of the underwater feeding pump 192 and rotated with operation of the underwater feeding pump 192 so as to decompose and pulverize a molecular cluster of the fluid 10 with an impact.

Also, a strainer which filters out foreign substances from the suctioned fluid 10 may be installed on the inlet of the gas dissolution unit 200 disposed on the front end of the underwater feeding pump 192, and a diffuser and a valve may be mounted on the outlet of the gas dissolution unit 200 to adjust a discharge flow rate and a pressure of the fluid 10.

As still another example, an entirety of the equipment including the fluid transfer unit 190 may be installed under the water to be submerged under the fluid supply source 30.

Also, the gas dissolution unit 200 may be disposed on only the front end of the underwater feeding pump 192. The central shaft 221 of the gas dissolution unit 200 may be connected to the motor shaft of the underwater feeding pump 192 and rotated with operation of the underwater feeding pump 192 so as to decompose and pulverize a molecular cluster of the fluid 10 with an impact.

Also, the flow path 130 may be provided inside the housing 110, and in detail, may be installed after the bubble generation unit 120 on the basis of a movement path of the fluid 10. Accordingly, both primary bubble generation and secondary finely bubble pulverization may occur in the housing 110.

As still another example, an entirety of the equipment including the fluid transfer unit 190 may be installed under the water to be submerged under the fluid supply source 30. Also, the gas dissolution unit 200 may be disposed on each of the front end and the rear end of the underwater feeding pump 192. Also, the gas supply lines 180 may be connected to the gas dissolution unit 200 so as to inject the same or different gases into the fluid 10.

In this case, the gas dissolution unit 200 disposed on the front end of the underwater feeding pump 192 may have the central shaft 221 connected to the motor shaft of the underwater feeding pump 192 and rotated with operation of the underwater feeding pump 192 so as to decompose and pulverize a molecular cluster of the fluid 10 with an impact.

Also, the flow path 130 may be provided inside the housing 110, and in more detail, may be installed after the bubble generation unit 120 on the basis of a movement path of the fluid 10. Accordingly, both primary bubble generation and secondary finely bubble pulverization may occur in the housing 110.

As described above, the gas dissolution unit 200 may include the pipe 210 installed on the transfer path of the fluid 10 and the mixing member 220 disposed in the pipe 210.

Figure 12:
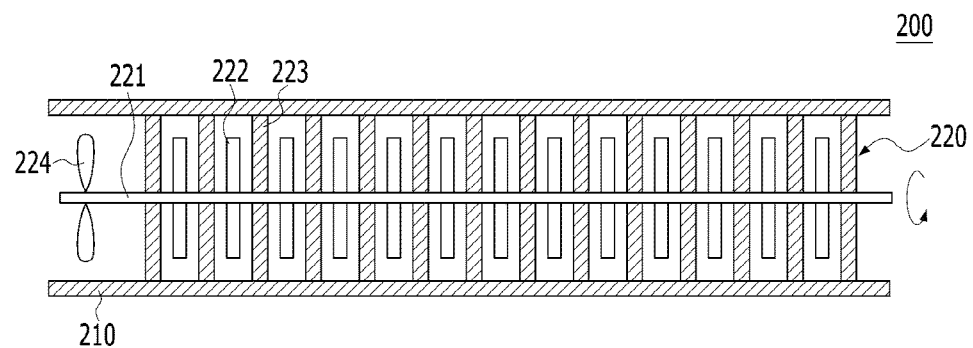
FIGS. 12 and 13 are views illustrating a gas dissolution unit according to still another embodiment of the present invention.

As shown in FIG. 12, the mixing member 220 may include the central shaft 221, a rotor member 222, a stator member 223, and a rotary vane 224. The mixing member 220 may be installed on a movement path of the fluid 10 in the pipe 210 and increase a gas-in-water rate of a gas in the fluid 10 according to collisions or friction of the fluid 10.

In the pipe 210, as shown in FIG. 12, the central shaft 221 may be disposed in a longitudinal direction so that both ends are rotatably installed in the pipe 210, the rotor member 222 may be coupled to the central shaft 221 and rotate with the central shaft 221, and the stator member 223 is a fixed type and may be fixedly installed in the pipe 210 to be spaced apart from the rotor member 222. Also, unlike FIG. 12, the central shaft 221 may be disposed in a diameter direction of the pipe 210, and the stator member 223 may be omitted from the pipe 210.

In this case, the rotor member 222 and the stator member 223 may be plate-shaped members and may be alternately disposed as shown in FIG. 12. Also, the rotor member 222 and the stator member 223 may have a mesh structure including a plurality of opening portions to allow the fluid 10 to pass therethrough.

The rotor members 222 and the stator members 223 are alternately arranged inside the pipe 210 as described above such that the fluid 10, which flows through the pipe 210, may cause collisions and friction with the rotor members 222 and the stator members 223 so as to further promote dissolution of a gas in the fluid 10.

The rotor member 222 coupled to the central shaft 221 as described above may be rotated by the rotary vane 224 with no power. As shown in FIG. 12, the rotary vane 224 may be installed on an end of the central shaft 221. The rotary vane 224 may rotate the rotor member 222 through a flow force of the fluid 10 which flows through the pipe 210.

Figure 13:
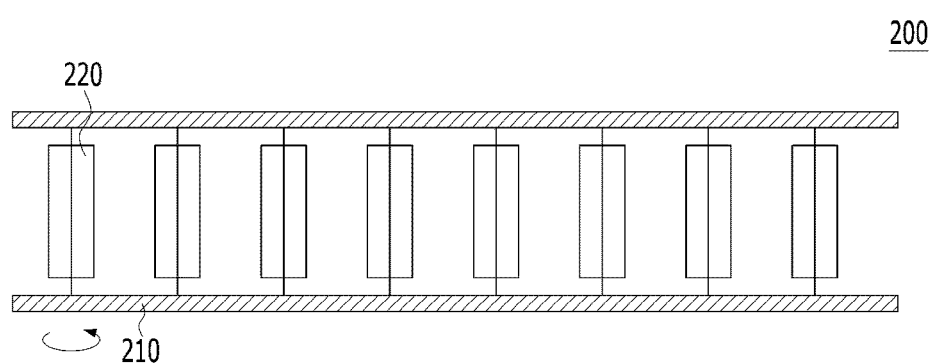

FIG. 13 illustrates a modification of a structure of the mixing member 220, and the mixing member 220 may be configured as a rotating plate rotatably installed in the pipe 210 and rotated by a flow force of the fluid 10. That is, a plurality of such rotating plates may have a rectangular shape and be arranged to be spaced at a certain interval apart in a longitudinal direction of the pipe 210. The rotating plates may be installed on the central shaft 221 traversing a diameter of the pipe 210 to be rotatable according to a flow of the fluid 10.

The plurality of rotating plates are installed on the movement path of the fluid 10 as described above such that the fluid 10 may cause collisions and friction with the rotating plates so as to further promote mixing a gas with the fluid 10.

Also, the mixing member 220 may be formed as a bent plate formed by being bent a plurality of times and disposed along the longitudinal direction of the pipe 210.

Figure 9:
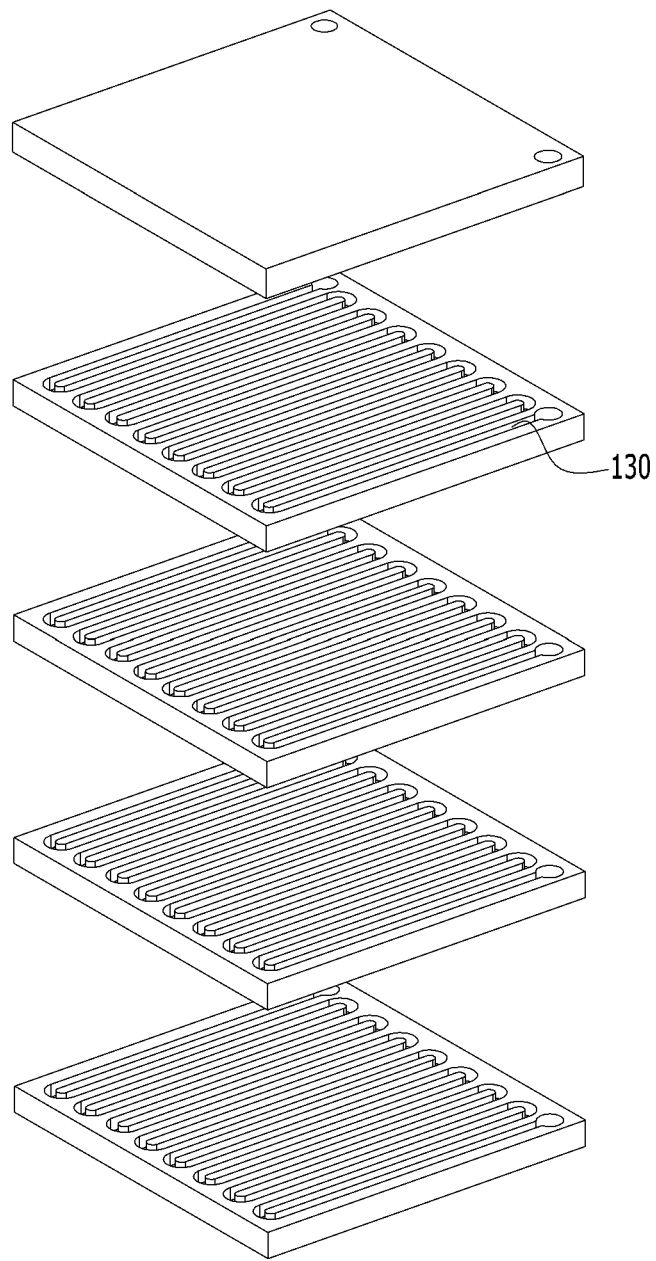

In more detail, as shown in FIG. 9, the mixing member 220 may be a bent plate which is alternately bent in a vertical direction to have a zigzag shape, and a plurality of such bent plates may be installed in the pipe 210 by adjusting a width thereof.

The mixing member 220 may function as an obstacle to a certain degree in the fluid 10 such that the fluid 10 flows while causing collisions and friction with the bent plate. Accordingly, a gas injected into the fluid 10 may be more effectively dispersed in and mixed with the fluid 10.

Although the embodiments of the present invention have been described above, it may be understood by one of ordinary skill in the art that a variety of modifications and changes may be made without departing from the concept and scope of the present invention disclosed within the range of the following claims.

The invention claimed is:

1. A nano-micro bubble generator comprising:
   a housing in which an inlet and an outlet are formed to allow a fluid to flow thereinto or therefrom;
   a bubble generation unit comprising a plurality of collision members installed on a movement path of the fluid inside the housing and arranged to be spaced apart from each other, wherein the bubble generation unit is configured to generate bubbles in the fluid according to collisions and friction with the fluid;
   a flow path disposed on at least one of an inside and an outside of the housing and configured to induce the bubbles in the fluid to be finely pulverized by stress generated during movement of the fluid; and
   a rotational shaft rotatably arranged in a longitudinal direction in the housing,
   wherein the plurality of collision members comprises first collision members rotatably coupled to the rotational shaft; and second collision members alternately disposed with the first collision members and fixedly installed in the housing,
   wherein the first collision members and the second collision members are plate shaped members,
   wherein the first collision members and the second collision members have a mesh structure formed by a plurality of lateral bars and a plurality of longitudinal bars intersecting in a lattice shape in which a plurality of opening portions are formed therebetween to allow the fluid to pass therethrough, and
   wherein the first collision members and the second collision members are adjacently arranged to generate collisions, friction, and cavitation caused by rotation of the first collision members in the fluid, which flows through the plurality of opening portions, and at least one of nano bubbles and micro bubbles are generated in the fluid.

2. The nano-micro bubble generator of claim 1, further comprising rotor blades which are installed on the rotational shaft and rotate at least one of the plurality of collision members due to a flow force of the fluid.

3. The nano-micro bubble generator of claim 1, wherein the flow path is formed inside the housing and disposed on at least one of before and after the bubble generation unit based on the movement path of the fluid.

4. The nano-micro bubble generator of claim 3, wherein the flow path comprises a first flow path disposed before the bubble generation unit in the movement path of the fluid and a second flow path disposed after the bubble generation unit in the movement path of the fluid, and wherein a movement of the fluid through the first flow path pretreats the fluid using shear stress generated until passing a boundary of a surface of the flow path, and a movement of the fluid through the second flow path finely pulverizes the bubbles generated by the bubble generation unit to stabilize the nano or micro bubbles.

5. The nano-micro bubble generator of claim 4, wherein the first and second flow paths have a zigzag structure.

6. The nano-micro bubble generator of claim 1, further comprising a chamber connected to at least one of the inlet and the outlet of the housing, wherein the flow path is formed inside the chamber.

7. The nano-micro bubble generator of claim 1, further comprising a different type fluid supply unit configured to supply a different type fluid to the fluid supplied to the housing, wherein the different type fluid differs from the fluid and has a gaseous or liquid state.

8. A nano-micro bubble generator comprising:
a fluid transfer unit configured to provide a flow force for transferring a fluid;
a gas supply line configured to supply a gas, which differs from the fluid, to the fluid transferred by the flow force of the fluid transfer unit;
a gas dissolution unit disposed on a transfer path of the fluid and configured to promote dissolution of the gas, which is supplied from the gas supply line, in the fluid; and
a nano-micro bubble unit configured to generate nano or micro bubbles in the fluid transferred from the gas dissolution unit,
wherein the nano-micro bubble unit comprises:
a housing in which an inlet and an outlet are formed to allow the fluid to flow thereinto or therefrom;
a bubble generation unit comprising a plurality of collision members installed on a movement path of the fluid inside the housing and configured to generate bubbles in the fluid according to collisions and friction with the fluid;
a flow path disposed on at least one of an inside and an outside of the housing and configured to induce the bubbles in the fluid to be finely pulverized by stress generated during movement of the fluid; and
a rotational shaft rotatably arranged in a longitudinal direction in the housing, wherein the plurality of collision members comprises first collision members rotatably coupled to the rotational shaft; and second collision members alternately disposed with the first collision members and fixedly installed in the housing, wherein the first collision members and the second collision members are plate shaped members, wherein the first collision members and the second collision members have a mesh structure formed by a plurality of lateral bars and a plurality of longitudinal bars intersecting in a lattice shape in which a plurality of opening portions are formed therebetween to allow the fluid to pass therethrough, and wherein the first collision members and the second collision members are adjacently arranged to generate collisions, friction, and cavitation caused by rotation of the first collision members in the fluid, which flows through the plurality of opening portions, and at least one of nano bubbles and micro bubbles are generated in the fluid.

9. The nano-micro bubble generator of claim 8, wherein the gas dissolution unit comprises:
a pipe disposed on the transfer path of the fluid; and
a mixing member disposed in the pipe and configured to mix the gas with the fluid.

10. The nano-micro bubble generator of claim 8, wherein the fluid transfer unit comprises an underwater feeding pump installed to be submerged in a fluid supply source which supplies the fluid.

11. The nano-micro bubble generator of claim 8, wherein the flow path comprises a first flow path disposed before the bubble generation unit in the movement path of the fluid and a second flow path disposed after the bubble generation unit in the movement path of the fluid, and wherein a movement of the fluid through the first flow path pretreats the fluid using shear stress generated until passing a boundary of a surface of the flow path, and a movement of the fluid through the second flow path finely pulverizes the bubbles generated by the bubble generation unit to stabilize the nano or micro bubbles.

12. The nano-micro bubble generator of claim 11, wherein the first and second flow paths have a zigzag structure.

* * * * *